United States Patent [19]

VanZeeland

[11] Patent Number: 5,448,290
[45] Date of Patent: Sep. 5, 1995

[54] VIDEO SECURITY SYSTEM WITH MOTION SENSOR OVERRIDE, WIRELESS INTERCONNECTION, AND MOBILE CAMERAS

[75] Inventor: Anthony J. VanZeeland, Mesa, Ariz.

[73] Assignee: Go-Video Inc., Scottsdale, Ariz.

[21] Appl. No.: 749,552

[22] Filed: Aug. 23, 1991

[51] Int. Cl.[6] .............................................. H04N 7/18
[52] U.S. Cl. .................................. 348/153; 348/159; 348/211; 348/213
[58] Field of Search ............... 358/108, 210, 229, 103; H04N 7/18; 348/143, 148, 153, 158, 159, 211, 213

[56] References Cited

U.S. PATENT DOCUMENTS

| | | | |
|---|---|---|---|
| 3,504,122 | 3/1970 | Ratliff | 358/210 |
| 3,580,998 | 5/1971 | Hammond | 358/108 |
| 4,709,265 | 11/1987 | Silverman | 358/108 |
| 4,916,532 | 4/1990 | Streck | 348/723 |
| 5,079,634 | 1/1992 | Hosono | 358/108 |
| 5,229,941 | 7/1993 | Hattori | 358/103 |

Primary Examiner—Howard W. Britton
Attorney, Agent, or Firm—Donald A. Streck

[57] ABSTRACT

This invention provides a family of improvements to video security systems. In a first embodiment, a television set employed for normal television viewing is switched to be the monitor of the security system only upon the happening of a security violation event as sensed by a sensor. I one variation thereof, the switching capability is built into a dual-deck VCR along with the ability to reset the system to normal television watching by means of the remote control for the VCR. In another embodiment, the video cameras of the system are made easily adjustable and relocateable by the use of a bi-directional wireless transmission system linking the cameras to the base station and monitor. Video is sent from the cameras and control signals to adjust the field of view of the cameras are sent without the need for connecting cables. In another variation and improvement on the latter embodiment, a video camera is mounted on a mobile platform so as to be moveable and guidable to locations within a security monitoring area.

8 Claims, 2 Drawing Sheets

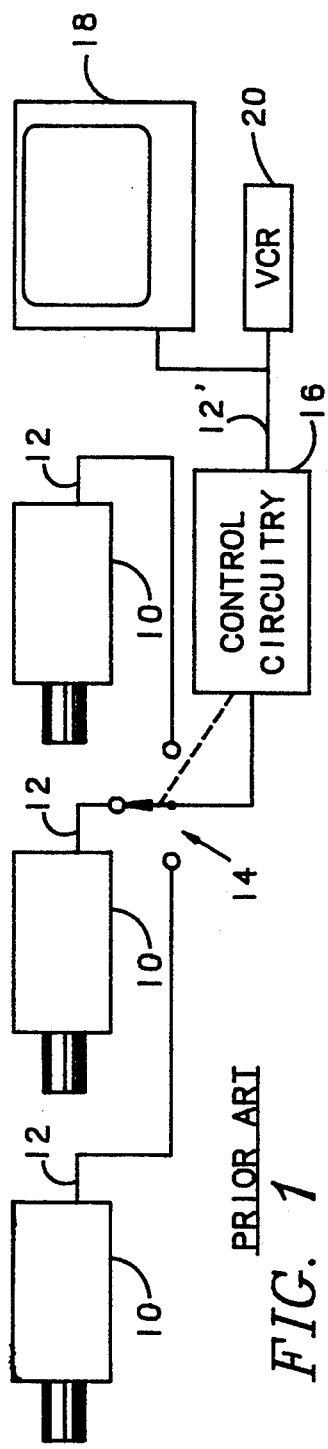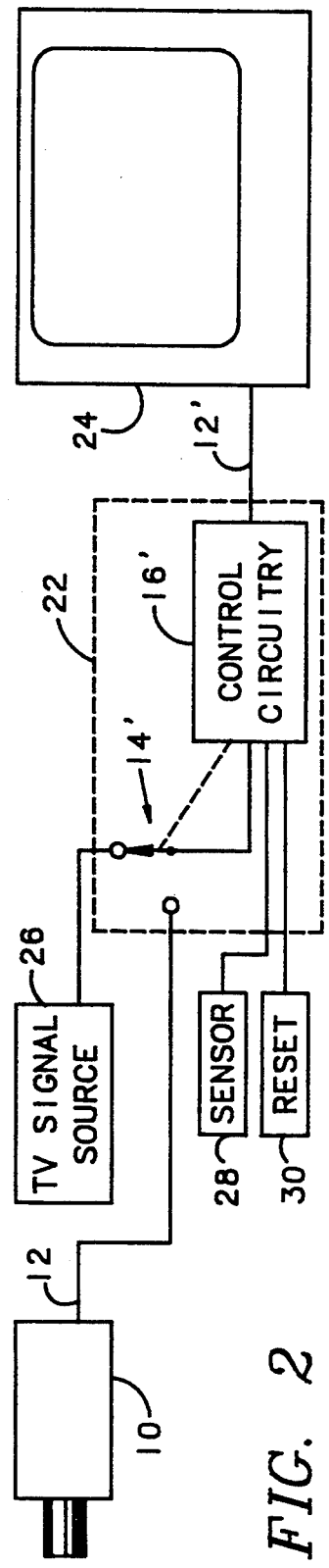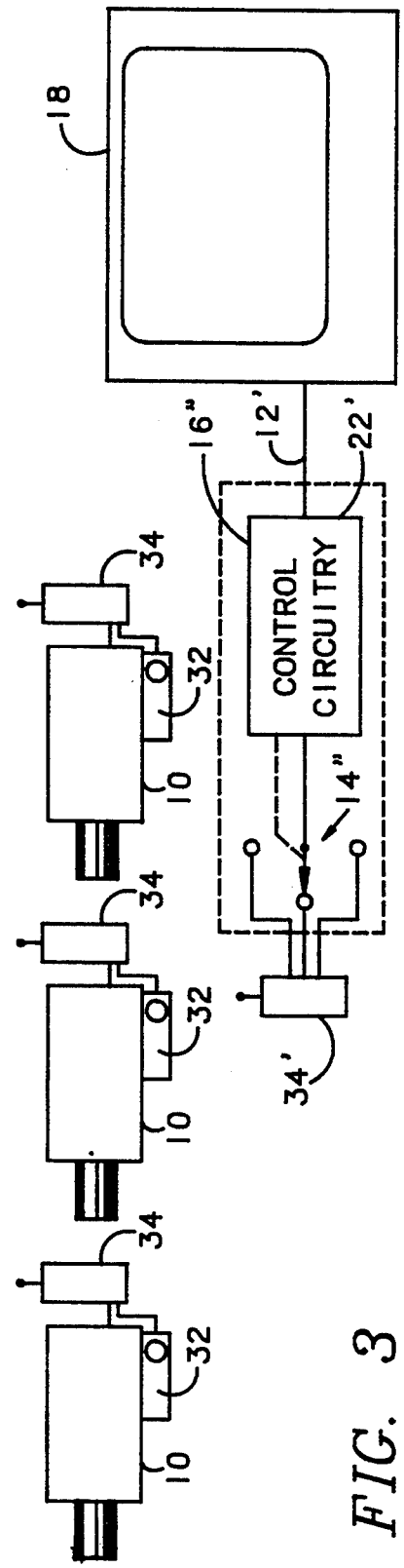

VIDEO SECURITY SYSTEM WITH MOTION SENSOR OVERRIDE, WIRELESS INTERCONNECTION, AND MOBILE CAMERAS

BACKGROUND OF THE INVENTION

The present invention relates to security systems for home and business and, more particularly, to security systems employing video cameras for visually monitoring areas of concern. Specifically, it relates to a family of improvements to video security systems. It relates to a television set being employed for normal television viewing and being switched to be the monitor of the security system only upon the happening of a security violation event as sensed by a sensor. It relates to the switching capability being built into a dual-deck VCR along with the ability to reset the system to normal television watching by means of the remote control for the VCR. It further relates to video cameras being made easily adjustable and relocateable by the use of a bi-directional wireless transmission system linking the cameras to a base station and monitor whereby video is sent from the cameras and control signals to adjust the field of view of the cameras are sent without the need for connecting cables. It still further relates to a video camera mounted on a mobile platform so as to be moveable and guidable to locations within a security monitoring area.

Video security systems as employed in homes and businesses have been quick to note the benefits of using video equipment as part of the system. Security guards can quickly switch from viewing one area under video surveillance to another area without ever having to leave their main security office. The cameras can be made to pan and zoom so as to modify the field of view. Banks, for example, cycle through the cameras mounted throughout the area and record the signal therefrom so as to have a video record for the past period of time in case any problems arise.

The foregoing seem idyllic and, as to many aspects thereof, it is. Certainly, it is better than before video equipment was made available for such uses. But, there are aspects of prior art video security systems which make them far from ideal. The esthetics of installation are one. When the first security-monitoring video systems were installed, it was typically into existing facilities such as banks, and the like, which were willing to put up with unsightly bundles of coaxial cables strung throughout their otherwise well-decorated offices to achieve the benefits that video provided for security purposes. Not only were the cables unsightly; but, it was apparent to anyone wishing to rob or embezzle from the bank that the simple application of wirecutters to the video cables removed their threat to identification and recognition. Thus, in new construction the banks were quick to specify that the cables for the video portions of the security system were to be routed through the walls along with the rest of the security wiring. As any security expert will tell you, however, you cannot find the ideal placement for camera until the building is constructed, the furniture and other equipment is placed, and people are working in the environment. With the wiring in the walls, movement of a video camera to a better location for viewing and security purposes became a difficult or impossible task. Not only that, whether the wires are inside or outside the walls, the security guards monitoring the system can only see what is within the range of movement (if any) or view of the cameras.

Another problem with prior art video security systems is that they are dedicated to twenty-four hour security purposes regardless of the other activities taking place in the area. In a large security installation having a central point from which the video monitor or monitors can be watched, such dedicated equipment is not troublesome. Even for a small business installation where a small monitor next to a receptionist's desk constantly displays an entryway outside of the normal field of vision, a dedicated camera connected to a dedicated monitor is not a problem or inconvenience. In a home environment on the other hand, for example, it is not normally desirable to have a monitor in the living room next to the television set displaying the view of the yard in the event that unauthorized persons enter. Likewise, while it may be nice to know who is at your front door when the bell rings and small, cheap, dedicated equipment for the purpose is certainly available, again it is not normally desirable to have a monitor in the living room next to the television set displaying the view of the entry in the event that someone comes.

Wherefore, it is an object of the present invention to provide improvements to video security systems which make the relocation of mounted cameras a quick and easy matter.

It is another object of the present invention to provide improvements to video security systems which make the use of mobile cameras a practical and inexpensive alternative or addition.

It is still another object of the present invention to provide improvements to video security systems which allow a normal television set to be employed as the security monitor in an only-as-needed capacity.

It is yet another object of the present invention to provide improvements to video security systems which allows a first signal into a security monitor to be interrupted and superceded on an as-needed basis.

Other objects and benefits of the invention will become apparent from the detailed description which follows hereinafter when taken in conjunction with the drawing figures which accompany it.

Summary

The foregoing objects have, in part, been achieved in a video system employing a first source of a video signal and a second source of a video signal, a switch for selecting between the first and second source to provide a video signal output, and a monitor for displaying the video signal output, by the improvement of the present invention comprising, the switch having a fail-safe position biased towards being connected to the first source; and, override means responsive to a first signal input thereto for switching the switch into connection with the second source and latching the switch in connection with the second source until a second signal is input thereto.

Preferably, there is also sensor means connected to the override means to provide the first signal thereto upon occurrence of a sensed event. Also preferably, there is reset means connected to the override means to provide the second signal thereto. In one variation of this embodiment, the switch and the override means are disposed within a video cassette recorder (VCR) having an infrared (IR) signal-responsive control circuit therein; and, the reset means comprises logic means contained within the IR signal-responsive control circuit for outputting the second signal to the override means in response to an IR signal from a controller for the VCR.

As a preferred implementation of this embodiment for home use, the first source of a video signal is a television signal; the second source of a video signal is a video signal from a security video camera; and, the monitor is a television set. Security sensor means are provided for sensing a security violation event and outputting the first signal to the override means as a result thereof whereby the television signal can be watched on the television set until such time as a security violation event is sensed by the security sensor means whereupon the television set becomes a monitor for a video security system.

The foregoing objects have also been achieved, in part, in a video security system employing a plurality of cameras monitoring individual fields of view in a security area and including adjustment means for adjusting a field of view of respective ones of the cameras, a monitor for viewing individual fields of view from the cameras, and switching means for selectively switching between respective ones of the cameras to provide a single signal input to the monitor for viewing, by the improvement of the present invention to provide ease of camera placement and relocation comprising, a plurality of first transmitter/receiver means located at respective ones of the cameras, each of the first transmitter/receiver means comprising, first receiver means connected to an associated adjustment means for receiving wirelessly broadcast control signals and inputting them to the adjustment means, and first transmitter means connected to a signal output of an associated camera for wirelessly broadcasting video signals from the camera; second transmitter/receiver means located at the monitor in conjunction with the switching means comprising, second receiver means for receiving wirelessly broadcast video signals from a first transmitter means and for outputting a video signal to the monitor, and second transmitter means for wirelessly broadcasting control signals to a first receiver means whereby to adjust the field of view of an associated camera; and, the switching means including means for selectively activating the first transmitter means and the first receiver means associated with only one camera at a time.

As a variation on this embodiment, at least one of the cameras is a mobile camera mounted on a mobile platform. Preferably, the adjustment means for adjusting a field of view of the mobile camera includes means for directing motion of the mobile platform to point the mobile camera in different directions and move the mobile camera to different observation points whereby to adjust the field of view. In a described version of this embodiment, the mobile platform is on wheels and the means for directing motion of the mobile platform comprises means for driving at least one of the wheels and means for steering at least one of the wheels.

Preferably, the adjustment means for adjusting a field of view of the mobile camera further includes means for raising and lowering a direction in which the mobile camera is pointed.

For optimum performance in a video security system, the means for directing motion of the mobile platform additionally comprises guide means for automatically guiding the mobile platform to a target position in response to a control signal received by the first receiver means thereof. To accomplish this according to one approach, sensor means are carried by the mobile platform for sensing a present position of the mobile platform and for providing the guide means with positional information whereby the guide means can direct the mobile platform to the target position.

For less optimum performance, the means for directing motion of the mobile platform additionally comprises guide means for guiding the mobile platform to a target position in response to control signals received by the first receiver means thereof and the system additionally includes control console means for a human operator to input control commands to the second transmitter means for transmission as the control signals.

DESCRIPTION OF THE DRAWINGS

FIG. 1 is a simplified drawing of a prior art video security system.

FIG. 2 is a simplified drawing of a video security system according to the present invention in a basic embodiment adding the ability to override a first signal into the system's security monitor upon the happening of a detected event.

FIG. 3 is a simplified drawing of a video security system according to the present invention in a wireless embodiment whereby easy relocation of the cameras is made possible.

Description of the Preferred Embodiment

Figure 4:
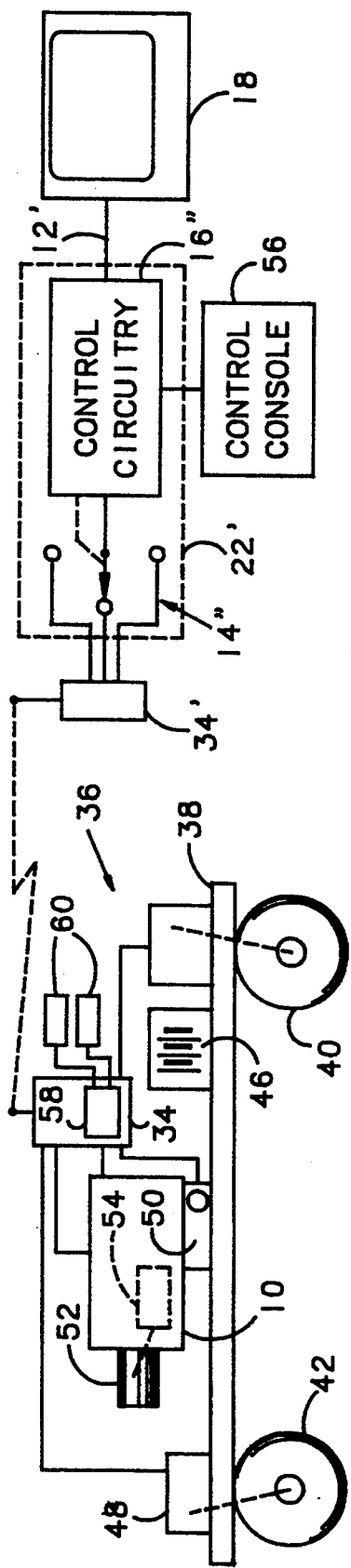
FIG. 4 is a simplified drawing of a mobile video security camera according to the present invention incorporating the wireless approach of FIG. 3.

The prior art approach to security systems with video most commonly employed (other than the very simple one-camera connected to one-monitor system) is shown in FIG. 1. A plurality of video cameras 10 are placed throughout the area of interest (inside and/or outside) and the signal outputs 12 therefrom are routed through a switch 14 controlled by control circuitry 16. While a manual switch can be employed for the switch 14, it is more common to have it automatically or electrically controlled. This is particularly true in banks and the like where the system continually sequences through the camera 10 being employed. The single signal output 12' from the control circuitry 16 is input to a monitor 18 and/or a video cassette recorder (VCR) 20.

In a first embodiment of the present invention as shown in FIG. 2, the above approach is modified as shown to make video security for the home and similar environments much more visually pleasing. As those skilled in the art will be quick to recognize and appreciate, this aspect of the present invention can be added simply and cheaply to the above-mentioned one-camera connected to one-monitor systems sold through discount business suppliers, and the like. In fact, the use of this embodiment of the present invention can be implemented as a stand-alone box to be used in addition to the small black and white monitor employed with such systems or in replacement thereof. As depicted in FIG. 2, the switching control box 22 of this embodiment is connected with its single signal output 12' connected to the signal input of a television set 24. The box 22 includes a switch 14' having one input position thereof connected to a source 26 of a television signal being watched (cable, VCR, etc.) and another input position thereof connected to the signal output 12 of a security video camera 10. The camera 10 can be placed in a home entryway or yard in keeping with the above-described problem areas of the prior art. There is also control circuitry 16' in which the input of the switch 14' selected by the control circuitry 16' is connected to the signal output 12'. In this embodiment of the present invention, the switch 14' has a fail-safe position connected to the source 26. There is also a sensor 28 connected to the control circuitry 16'. The sensor 28 can comprise, for example, the front doorbell activation circuit for entryway monitoring or an infrared motion sensor for yard intruder monitoring. As stated above, switch 14' has a fail-safe position connected to the source 26, which means that under normal circumstances, the source 26 is biased towards connection to the television set 24 for normal viewing. Should an event occur requiring monitoring (such as someone ringing the front doorbell), the control circuitry 16' switches the switch 14' to connect the signal output 12' to the television set 24 whereby to monitor the view of the camera 10. The switch 14' stays latched in that position until reset by the reset means 30. The reset means 30 can be a manual reset button or could be activated by a remote control device.

Figure 5:
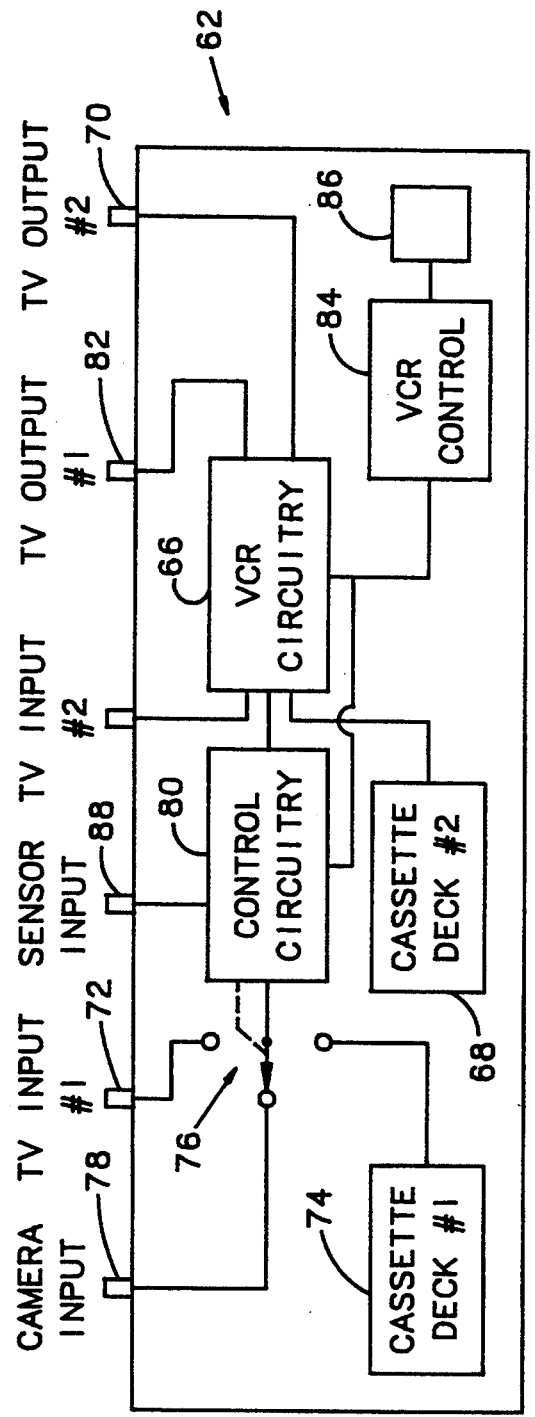
FIG. 5 is a functional block diagram of one embodiment of the present invention incorporated into a dual-deck video cassette recorder.

In this latter regard, the assignee of this application, GO-VIDEO, INCORPORATED, is also the manufacturer of dual-deck VCR sold under the trademark VCR-2. Such a dual-deck VCR would be an ideal platform into which to incorporate this embodiment of the present invention as it provides two channel video capability and IR remote control capability. The input from the video security camera could be made easily and switchably connectable through the circuitry of the VCR-2 dual-deck VCR while the IR control circuitry thereof could be adapted in like manner to include the capability of resetting switch 14'. Such an implementation is shown in FIG. 5 with respect to the dual-deck VCR generally indicated as 62. The tv or video input #2 64 operates in the normal manner being routed through the VCR circuitry 66, which selects between the signal on input #2 64 and the output from cassette deck #2 68 as to which signal to output on the tv or video output #2 70. Input #1 72 and cassette deck #1 74 are input through the switch 76 along with the camera input 78 into the control circuitry 80 before going to the VCR circuitry 66 and from thence to output #1 82. The sensor input 88 provides the sensor signal to the control circuitry 80 to switch the switch 76 to the camera input 78 and latch it there as described above. Note also that the VCR control circuitry 84 which gets its IR control signal inputs from the IR detector 86 is connected both to the VCR circuitry 66 and the control circuitry 80 to provide the reset signal as also described above.

As those skilled in the art will readily recognize and appreciate, the embodiment of FIG. 2 could also be employed to switch from a master video security camera 10 being viewed on a monitor 18 to that view being superceded in the abovedescribed manner to the view of an alternate video security camera 10 only upon the occurrence of an unexpected event as sensed by the sensor 28.

A second embodiment of the present invention is shown in FIG. 3 where increased flexibility of camera placement and relocation is provided by the use of wireless connections to and from the cameras 10. It will be noted that the wireless connection in the preferred embodiment as depicted is bi-directional in nature. Such wireless technology is shown in issued U.S. Pat. No. 4,916,532 entitled TELEVISION LOCAL WIRELESS TRANSMISSION AND CONTROL which issued on Apr. 10, 1990 and details of implementing a bi-directional video and control system can be found by reference to that patent. Accordingly, the specifics thereof will not be addressed herein in the interest of simplicity and the avoidance of redundancy. It is the employment of such technology within a security video system in the manner being described which is the novel aspect of this invention. As shown in FIG. 3, each camera 10 is mounted to an attitude adjustable mounting apparatus 32. Thus, using the apparatus 32, the camera 10 can be adjusted up and down and left and right. Both the camera 10 and the apparatus 32 are connected to a first transmitter/receiver 34 operating in the legal bands for the transmittal of video and control information. A second transmitter/receiver 34' is located at the control circuitry 16 and monitor 18 and connected to the control circuitry 16. In application Ser. No. 639,109, filed Jan 9, 1991 by John R. Berkheimer entitled MULTI-CAMERA VIDEO SYSTEM EMPLOYING WIRELESS INTERCONNECTIONS, now abandonded, which is also assigned to the assignee of this invention, there are various methods and apparatus shown for selectably connecting multiple cameras to a single user. Those teachings are relevant hereto and are incorporated herein by reference. For purposes of the objectives of this invention combining both multiple cameras and multiple controls (i.e. the apparatus 32 for each camera 10), the approach of that co-pending application wherein the transmitter/receiver 34' sends a multiplexed on/off signal to the transmitter/receivers 34 to enable and disable them so that a single transmitting frequency can be employed for the video is preferred. To attain the objectives of this invention, each transmitter/receiver 34 is turned on and off individually in response to a unique signal from the transmitter/receiver 34' both as to the video signals being transmitted from the associated camera 10 and the control signals being transmitted to the associated apparatus 32. Thus, only a transmitter/receiver 34 which has been turned on or enabled can transmit its video signal for viewing on the monitor and can receive control signals to move the camera 10 with the apparatus 32. Within FIG. 3, this approach is represented by the switch 14" controlled by the control circuitry 16" within the switching control box 22' having its outputs all connected to the transmitter/receiver 34'.

By employing another application of the technique of FIG. 3, the third embodiment of the present invention to achieve the further objects thereof can be realized as shown in FIG. 4. Mobile "robots" having television cameras for "eyes" are, of course, known in the art in general and in science fiction movies in particular. Everyone is familiar with C3PO and R2-D2 of Starwars fame. Likewise, unmanned vehicles built and proposed by NASA and others moving under the control of telemetered signals across space and sending back television pictures of strange planets are known and of relevance. Such devices, while known in fact or imagination, are not practical for inclusion in a generally-available, low-cost security system. They are large, slow, and astronomical in price. On the other hand, so-called "radio controlled" model boats, cars, and planes have been available for many years; but, to date, no one has incorporated a security camera therein to make it mobile—much less in a practical way. Likewise, at least one model railroad parts manufacturer now offers a miniature television camera mounted in a train engine which sends the video signal back along the conducting track for viewing by an operator at the control station. Thus, despite all this prior art and the long-felt need for a practical mobile video camera for security uses, nobody has thought to combine the suggestions of that prior art into a practical mobile security camera until the present invention as depicted in FIG. 4.

As built and tested, the mobile camera 36 of FIG. 4 comprises a base 38 having driving wheels 40 and steering wheels 42 mounted thereon. The driving wheels are driven by a bi-directional electric motor 44 as powered by the rechargeable battery 46. Battery 46 also provides the power for the other electrical and electronic components of the mobile camera 36. The steering wheels 42 are moved bi-directionally in a horizontal direction (i.e. steered) by the steering motor 48. A video camera 10 is mounted on the base 38 for vertical pivotal movement by the elevation adjusting motor 50. Preferably, the camera 10 also has a zoom lens 52 that can be adjusted by the zoom motor 54 (probably built into the camera 10). All the foregoing components are controlled by signals coming into a transmitter/receiver 34 from a transmitter/receiver 34' located at the monitor and control station as described above with respect to FIG. 3. The signal output from the camera 10 is also transmitted by the transmitter/receiver 34 as described above with respect to FIG. 3. It should be noted that the mobile camera 36 of FIG. 4 could be employed as part of the system of FIG. 3 with particular adaptability. For such purpose, the control circuitry 16" would only have to have a control console 56 for the input thereto of manual control signals to be sent by the transmitter/receiver 34' to the transmitter/receiver 34 at the mobile camera 36 to affect control functions specified by a human operator. One might also want to include supplemental control logic 58 within the transmitter/receiver 34 and connected to one or more sensors 60 capable of sensing position within the security environment (as with embedded wires in the floor, wall sensors, etc. as known in the art) so that the mobile camera can be directed by a human operator (or security logic in a computer-based system) to proceed to a particular location within the environment and can do so without further input. It should also be noted that if more than one camera (either fixed cameras 10 or mobile cameras 36) is to be included within a security system according to this invention, the ability to select only one transmitter/receiver 34 to be operational at a time would have to be included. In such case, the above-described ability of the mobile camera 36 to proceed automatically to a location within the environment being monitored as a result of a single broadcast control command would be a virtual necessity. Without such a capability, the mobile camera(s) 36 would take so much control time by an operator that the other aspects of the security system would be left unattended.

As those skilled in the art will readily recognize and appreciate, the above-described mobile security camera as employed with a wheeled base could also be incorporated into any number of mobile platforms within the scope and spirit of the present invention. For example, the mobile platform could comprise a hovercraft, a boat, a plane, a helicopter, or the like. Also, while primarily intended for security purposes, the mobile camera 36 of this embodiment could also be sold and employed as an entertainment device and for other commercial purposes.

Wherefore, having thus described the present invention,

What is claimed is:

1. In a video security system employing a plurality of cameras monitoring individual fields of view in a security area and including adjustment means for adjusting a field of view of respective ones of the cameras, a monitor for viewing individual fields of view from the cameras, and switching means for selectively switching between respective ones of the cameras to provide a single signal input to the monitor for viewing, the improvement to provide ease of camera placement and relocation comprising:
   a) a plurality of first transmitter/receiver means located at respective ones of the cameras, each of said first transmitter/receiver means comprising,
      a1) first receiver means connected to an associated adjustment means for receiving wirelessly broadcast control signals and inputting them to the adjustment means, and
   a2) first transmitter means connected to a signal output of an associated camera for wirelessly broadcasting video signals from the camera;
   b) second transmitter/receiver means located at the monitor in conjunction with the switching means comprising,
      b1) second receiver means for receiving wirelessly broadcast video signals from a said first transmitter means and for outputting a video signal to the monitor, and
      b2) second transmitter means for wirelessly broadcasting control signals to a said first receiver means whereby to adjust the field of view of an associated camera; and,
   c) the switching means including means for selectively activating said first transmitter means and said first receiver means associated with only one camera at a time.

2. The improvement to a video security system of claim 1 wherein:
   at least one of the cameras is a mobile camera mounted on a mobile platform.

3. The improvement to a video security system of claim 2 wherein:
   the adjustment means for adjusting a field of view of said mobile camera includes means for directing motion of said mobile platform to point said mobile camera in different directions and move said mobile camera to different observation points whereby to adjust said field of view.

4. The improvement to a video security system of claim 3 wherein:
   a) said mobile platform is on wheels; and,
   b) said means for directing motion of said mobile platform comprises means for driving at least one of said wheels and means for steering at least one of said wheels.

5. The improvement to a video security system of claim 4 wherein:
   said adjustment means for adjusting a field of view of said mobile camera further includes means for raising and lowering a direction in which said mobile camera is pointed.

6. The improvement to a video security system of claim 4 wherein:
   a) said means for directing motion of said mobile platform additionally comprises guide means for guiding said mobile platform to a target position in response to control signals received by said first receiver means thereof; and additionally comprising,
   b) control console means for a human operator to input control commands to said second transmitter means for transmission as said control signals.

7. The improvement to a video security system of claim 4 wherein:
   said means for directing motion of said mobile platform additionally comprises guide means for automatically guiding said mobile platform to a target position in response to a control signal received by said first receiver means thereof.

8. The improvement to a video security system of claim 7 and additionally comprising:
   sensor means carried by said mobile platform for sensing a present position of said mobile platform and for providing said guide means with positional information whereby said guide means can direct said mobile platform to said target position.

* * * * *